United States Patent Office 3,764,360
Patented Oct. 9, 1973

3,764,360
PROCESS FOR PREPARING PHTHALOCYANINE PIGMENTS
Robert Langley, Newton Mearns, Scotland, assignor to Ciba-Geigy AG, Basel, Switzerland
No Drawing. Filed Jan. 19, 1971, Ser. No. 107,826
Claims priority, application Great Britain, Jan. 23, 1970, 3,330/70
Int. Cl. C08h *17/14*
U.S. Cl. 106—288 Q  13 Claims

ABSTRACT OF THE DISCLOSURE

Process for the manufacturing of phthalocyanine pigments having improved brightness, gloss, transparency and flow properties by treating with a polar aliphatic solvent at least partially water-miscible, a metal Pc and a minor proportion of a copper Pc derivative having the formula

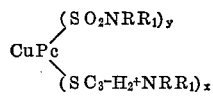

wherein CuPc represents the copper phthalocyanine residue, either chlorinated or unchlorinated, R represents an alkyl group having from 1 to 20 carbon atoms or an aryl group, and $R_1$ represents hydrogen or an alkyl group having from 1 to 20 carbon atoms or an aryl group, the alkyl or aryl groups being either unsubstituted or substituted by hydroxyl, amino, alkylamino or amide substituents, and $x$ and $y$ each represent 1, 2 or 3 with the proviso that the sum of $x$ and $y$ is 2, 3 or 4.

DETAILED DESCRIPTION

The present invention relates to a process of pigment treatment and in particular to a process of pigment treatment by means of which a pigment is produced having improved brightness ad flow properties.

In our British Pat. No. 1,140,836 there is described and claimed a process of treating a metal phthalocyanine blue pigment comprising mixing the phthalocyanine blue pigment, in dry pigmentary form, with a polar aliphatic solvent which is at least partially water-miscible, and separating the solvent from the treated pigment. By means of this solvent treatment a substantial improvement in the strength or brightness of the treated pigment is achieved.

We have now found that if we combine this solvent treatment process with the addition to the metal phthalocyanine blue of a specific copper phthalocyanine containing sulphonamide groupings, a pigment is produced which exhibits, in addition to improved brightness, substantially improved flow properties, especially in inks.

Accordingly, the present invention provides a process in which a pigment having improved brightness, gloss, transparency and flow properties is produced, comprising contacting a metal phthalocyanine blue pigment, in dry pigmentary form, with a polar aliphatic solvent which is at least partially water-miscible, and separating the solvent from the treated pigment, in which there is added to the metal phthalocyanine blue pigment before it is contacted with the solvent, during the contacting, or after it has been separated from the solvent, a minor proportion of a copper phthalocyanine derivative having the formula:

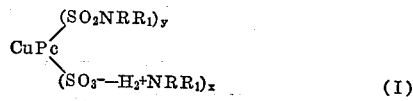

(I)

wherein CuPc represents the copper phthalocyanine residue, either chlorinated or unchlorinated, R represents an alkyl group having from 1 to 20 carbon atoms or an aryl group, and $R_1$ represents hydrogen or an alkyl group having from 1 to 20 carbon atoms or an aryl group, the alkyl or aryl groups being either unsubstituted or substituted by hydroxyl, amino, alkylamino or amide substituents, and $x$ and $y$ each represent 1, 2 or 3 with the proviso that the sum of $x$ and $y$ is 2, 3 or 4.

The phthalocyanine blue pigment may be copper-, cobalt-, zinc-, cadmium-, nickel- or other transition metal-phthalocyanine and may contain halogen, especially chlorine in the phthalocyanine molecule; copper phthalocyanine optionally containing up to 20% by weight of chlorine is preferred. Of the copper complexes, the pigment may be, for example, a phthalocyanine blue in either the alpha or beta form, or a mixture of the two crystal forms.

The metal phthalocyanine blue pigment starting material to be treated with the solvent and the derivative of Formula I is in dry pigmentary form. Any conventional conditioning method of converting initial crude non-pigmentary material into pigmentary form may be employed. In a preferred embodiment dry crude material is converted into pigmentary form by subjecting it to grinding with an alkali metal or alkaline earth metal salt of an organic or inorganic acid, preferred organic acids being those having from 1 to 4 carbon atoms, especially acetic acid, and preferred inorganic acids being hydrochloric and sulphuric acids or a mixture of such acids. Specific salts which are advantageously present during the grinding include, therefore, sodium chloride, calcium chloride, potassium chloride, sodium sulphate, magnesium sulphate, sodium acetate and calcium acetate. The proportion of metal salt used in the grinding operation is desirably within the range of from 50% to 1000% by weight, more preferably within 200% to 500% by weight, based on the weight of the crude metal phthalocyanine starting material. The grinding operation may be carried out using only dry crude material and metal salt or may be effected in the presence of a small amount of an organic solvent, for instance a hydrocarbon or organic amine, especially toluene or xylene or dimethylaniline or diethylaniline.

In other less preferred embodiments, the crude non-pigmentary phthalocyanine material may be converted into pigmentary form by forming a dispersion or paste of the crude material in water by means of milling, for instance in a pebble-mill, in the presence of a dispersing agent, which may be of the cationic, anionic or non-ionic type, and thereafter drying the milled material. The crude phthalocyanine material may alternatively be converted into pigmentary form by acid pasting, especially by stirring with concentrated sulphuric acid at an elevated temperature, pouring the stirred acid mixture into water, separating off the pigment and washing it free from acid.

While the pigment starting-material to be treated by the process of the invention may be in any pigmentary form, it is advantageous to use a form in which the average pigment particle size is within the range of from 0.02 to 1.0 micron.

The polar aliphatic solvent with which the pigment is treated is one which is at least partially miscible with water.

Suitable solvents include alkanols having from 1 to 4 carbon atoms in the alkyl chain, for example methanol, ethanol, n-propanol, isopropanol and n-butanol; alkyl monocarboxylates having from 1 to 4 carbon atoms in the alkyl chain, for example alkyl esters of alkanoic acids especially ethyl acetate; dialkyl ketones having from 1 to 4 carbon atoms in each alkyl chain, for instance acetone, methyl ethyl ketone or diethyl ketone; alkoxy alkanols having from 1 to 4 carbon atoms in each of the alkyl chains of the alkoxy and alkanol components for instance, 2-methoxy ethanol or 2-ethoxyethanol; or alkylene glycols having from 2 to 6 carbon atoms in the alkylene chain, for example, ethylene glycol or diethylene glycol.

The solvent may, if desired, contain dissolved water in a proportion insufficient to cause separation into two phases, and may thus be, for example, aqueous ethanol (for instance industrial methylated spirits), an azeotropic mixture of ethanol and water or an azeotropic mixture of isopropanol and water, the alkanol in each case being the major constituent.

The treatment of the pigment with the solvent may be effected under a wide variety of conditions, the particular temperature and pressure at which the treatment is effected and the time during which the pigment and solvent are contacted being dependent on the nature of the pigment and of the solvent in order to secure the optimal improvement in pigmentary properties. Although the pigment is preferably contacted with the solvent at a temperature in the range of from 10° C. to the boiling point of the solvent at the pressure applied, a temperature of from 50° C. to the boiling point is particularly preferred when the treatment is carried out at atmospheric pressure. Although a superatmospheric pressure may be applied, if desired, for example when the solvent used is highly volatile at the treatment temperature chosen, it is generally convenient to treat the pigment with the solvent at atmospheric or substantially atmospheric pressure.

The proportion of solvent with which the pigment is treated in the process to the pigment is preferably in the range of from 0.5 to 20 parts by weight of solvent per part by weight of pigment, the proportion of 1 to 15 and especially 5 to 10 parts by weight of solvent per part by weight of pigment being particularly preferred. If the proportion of solvent to pigment is above that of the preferred range, no further significant improvement in the pigmentary properties of the treated pigment is achieved. If the proportion of solvent to pigment is below that of the preferred range, the strength of brightness of the treated pigment is inferior to that of the same pigment when treated with a proportion of solvent within the preferred range.

After treatment of the pigment with the solvent, the solvent may be removed, for instance by filtering or centrifuging off the treated pigment. Subsequent washing of the treated pigment is in general unnecessary and may, in fact, have a deleterious effect on the enhanced pigmentary properties; if the treated pigment is washed, however, for instance to remove ethylene glycol or other high-boiling solvent, it is preferably washed with water or with acetone, isopropanol or other low-boiling solvent with which the high-boiling solvent is miscible.

The pigment which is treated, may be in the form of a mixture of the metal phthalocyanine blue with a salt, especially the mixture resulting from the preparation of the colouring matter in pigmentary form by grinding with the salt; the mixture of the organic solvent and pigment is then preferably treated by admixing it with a proportion of water sufficient to dissolve the salt present, distilling off the organic solvent from the resulting two-phase liquid mixture, filtering or otherwise separating off the pigment obtained as residue and washing it with water until salt free.

The substituents R and $R_1$ of the copper phthalocyanine derivatives of Formula I may each represent a cyclic or acyclic alkyl group having from 1 to 20, preferably from 1 to 6, carbon atoms, for example a methyl, ethyl, propyl, butyl, hexyl, cyclohexyl, octyl, decyl, dexadecyl, octadecyl or eicosyl group, but are preferably ethyl groups. Alternatively, one or both of R and $R_1$ may represent an aryl radical, especially a phenyl radical. These alkyl groups may be unsubstituted, but are desirably substituted by one or more, preferably one substituted which may be an amino group, an alkylamino group preferably one having from 1 to 4 carbon atoms in the alkyl chain, an amide group or most preferably a hydroxyl group.

Of the copper phthalocyanine derivatives of Formula I, those derivatives are preferred in which $R_1$ represents hydrogen, R represents an alkyl group having from 1 to 6 carbon atoms substituted by a hydroxyl group and in which $x$ and $y$ each represent 2. A particularly preferred derivative of Formula I has the formula:

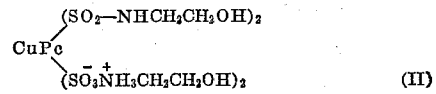

The copper phthalocyanine derivatives of Formula I may be produced, for example, by reacting copper phthalocyanine containing $x$ sulphonic acid groups and $y$ sulphonyl chloride groups with from 2 to 4 molecules of an amine $RNHR_1$ wherein $x$, $y$, R and $R_1$ have their previous significance, or with a mixture of such amines.

Up to 20% by weight, preferably from 5% to 15.0% by weight, of the copper phthalocyanine derivative of Formula I based on the weight of untreated metal phthalocyanine, may be incorporated into the latter. Amounts higher than this give less desirably greener results and amounts less than 5% by weight are less effective in producing the desired improvements in pigment properties.

The copper phthalocyanine derivative of Formula I can be incorporated during any of the various stages involved in the process according to the invention. For instance, the derivative of Formula I can be incorporated during any conditioning, such as salt-milling, of initial crude material, during the treatment with solvent, or after the removal of the solvent.

Although the degree of improvement in pigmentary properties brought about by the process of the invention depends to some extent on the pigment treated, solvent used and treatment conditions, an increase in gloss and transparency as well as up to about 25% in pigment strength or brightness (otherwise known as "clean-ness") of the pigment can be achieved, especially in flexographic liquid ink systems based on polyamide or nitrocellulose.

Although the process of the present invention can be carried out using any phthalocyanine "blue pigment" in dry pigmentary form, the process may be carried out with particular advantage, according to one embodiment of the invention, using as starting material a mixture of the alpha and beta forms of phthalocyanine blue; by carrying out the procedure on such mixtures, the pigment may be converted into phthalocyanine blue which is substantially in the beta form. In this manner, beta form phthalocyanine blue pigments of high pigmentary strength can be produced.

The pigments prepared in accordance with the above process are useful in coloring high molecular organic compounds.

The following examples further illustrate the present invention. Parts by weight shown therein bear the same relation to parts by volume as do kilograms to litres. Parts and percentages are expressed by weight unless otherwise stated.

EXAMPLE 1

25 parts of crude β copper phthalocyanine were ground with 45 parts of anhydrous sodium sulphate and 5 parts of anhydrous sodium acetate until the phthalocyanine was in pigmentary form. The pigment/salt mixture was then added to 250 parts of isopropanol and the mixture heated under reflux conditions for 4 hours. 250 parts of water were added to the mixture and the solvent removed by distillation. 2.5 parts of the compound having the formula:

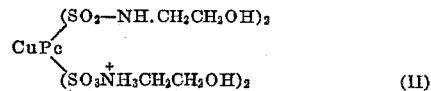

dissolved in 250 parts of water were added, and the pH value of the mixture was lowered to 1.0 by the addition of hydrochloric acid. After stirring the whole at 60° C.

for 30 minutes, the suspension was filtered, washed free from soluble salts with water and dried at 60° C.

The pigment so produced exhibited excellent brightness and flow properties in polyamide and nitrocellulose flexographic ink systems. In contrast, a pigment produced according to the same method but without the addition of the compound of Formula II exhibited inferior flow properties.

EXAMPLE 2

25 parts of chlorinated copper phthalocyanine containing 2.0% by weight of chlorine were ground with 54.5 parts of hydrated calcium chloride, 15.5 parts of anhydrous calcium chloride and 5 parts of anhydrous sodium acetate for 8 hours. The salt/pigment mixture was then added to 333 parts of isopropanol and the whole heated under reflux conditions for 4 hours.

2.5 parts of the compound having the formula:

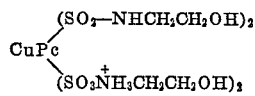

in 250 parts of water were added slowly and the solvent subsequently removed by distillation. 10 parts of concentrated hydrochloric acid were added and, after stirring for 30 minutes at 60° C., the slurry was filtered, washed with hot water until free from soluble salts and dried at 60° C.

The pigment produced had good brightness and flow properties in polyamide inks.

EXAMPLE 3

50 parts of a copper phthalocyanine prepared by acid pasting, were added to 500 parts of acetone and the mixture stirred and heated under reflux conditions for 4 hours. 100 parts of sodium sulphate dissolved in 500 parts of water were added and the acetone was removed from the mixture by distillation. 5 parts of the compounds of formula:

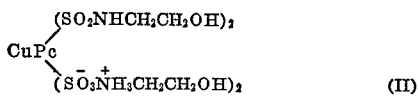 (II)

dissolved in 50 parts of water were added and the pH value of the mixture was lowered to 1.0 by the addition of hydrochloric acid. The slurry was filtered, washed and dried at 60° C.

The resulting pigment had much better flow properties in a polyamide ink than a similar compound produced according to a similar method but without the addition of the compound of Formula II.

A similar improvement in flow properties was achieved according to the invention using the process described in Example 3 but using, instead of the compound of Formula II, a compound produced by reacting one mole of copper phthalocyanine containing two sulphonic acid groups and two sulphonyl chloride groups with two moles of 2-ethylhexylamine and two moles of n-butylamine.

EXAMPLE 4

25 parts of crude β copper phthalocyanine and 3.3 parts of the compound of formula:

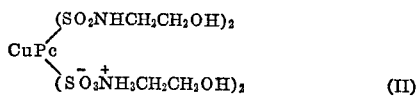 (II)

were ground with 70 parts of anhydrous sodium sulphate and 5 parts of anhydrous sodium acetate. This mixture was then added to 333 parts of isopropanol and the whole heated under reflux conditions for 4 hours. 250 parts of water were added and the isopropanol removed by distillation. The pH value of the slurry was lowered to 1.0 by the addition of hydrochloric acid and the slurry filtered, the filter-cake washed with hot water until free from soluble salts and dried at 60° C.

The pigment produced had good flow properties in polyamide inks.

EXAMPLE 5

25 parts of crude β copper phthalocyanine were ground with 70 parts of anhydrous sodium sulphate and 5 parts of anhydrous sodium acetate until it is converted to pigmentary form. The pigment/salt mixture was stirred into 333 parts of isopropanol containing 3.3 parts of the compound of Formula II as defined in Example 1, and the mixture was heated under reflux conditions for 4 hours. 250 parts of water were added and the solvent removed by distillation. After lowering the pH value of the mixture to 1.0 by the addition of hydrochloric acid, the slurry was filtered, the filter-cake washed with hot water and dried at 60° C.

The resulting pigment had good flow properties in polyamide and nitrocellulose inks.

Similar results were achieved by carrying out the process described in Example 5 but replacing the compound of Formula II by the compound having the formula:

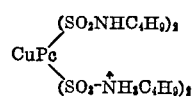

What we claim is:

1. A process for preparing a pigment which comprises contacting a metal phthalocyanine blue pigment, in dry pigmentary form, with a polar aliphatic solvent which is at least partially water-miscible, and separating the solvent from the treated pigment, wherein a minor proportion of a copper phthalocyanine of the formula

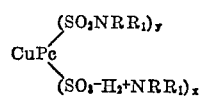

wherein CuPc represents an optionally chlorinated copper phthalocyanine residue, R represents cyclic or acyclic alkyl of from 1 to 6 carbon atoms or phenyl, $R_1$ represents hydrogen, cyclic or acyclic alkyl of from 1 to 6 carbon atoms or phenyl, the alkyl groups representing R and $R_1$ optionally being substituted by one member of the group of hydroxyl, amino, alkylamino of from 1 to 4 carbon atoms or amide, and $x$ and $y$ each represent the integer 1, 2 or 3, with the proviso that the sum of $x$ and $y$ is 2, 3 or 4 is added to the metal phthalocyanine blue pigment.

2. The process according to claim 1, wherein the copper phthalocyanine is added to the blue pigment prior to contact of the blue pigment with the solvent.

3. The process according to claim 1, wherein the copper phthalocyanine is added to the blue pigment during contact of the blue pigment with the solvent.

4. The process according to claim 1, wherein the copper phthalocyanine is added to the blue pigment after separation of the solvent from the treated pigment.

5. The process as claimed in claim 1, wherein from 5% to 15% by weight, based on the weight of the blue pigment, of the copper phthalocyanine is incorporated into the blue pigment.

6. The process as claimed in claim 1 wherein the phthalocyanine pigment is copper blue.

7. The process as claimed in claim 1, wherein the average particle size of the blue pigment is within the range of from 0.02 to 1.0 micron.

8. The process as claimed in claim 1, wherein the solvent is an alkanol having from 1 to 4 carbon atoms, an alkyl monocarboxylate having from 1 to 4 carbon atoms in the alkyl chain, a dialkyl ketone having from 1 to 4 carbon atoms in each alkyl chain, an alkoxy alkanol having from 1 to 4 carbon atoms in each of the alkoxy and alkanol components or an alkylene glycol having from 2 to 6 carbon atoms.

9. The process as claimed in claim 1, conducted at a temperature in the range of from 50° C. to the boiling point of the solvent and at atmospheric pressure.

10. The process as claimed in claim 1, wherein the proportion of solvent to blue pigment is within the range of from 5 to 10 parts by weight of solvent per part by weight of pigment.

11. The process as claimed in claim 1, wherein the copper phthalocyanine has the formula:

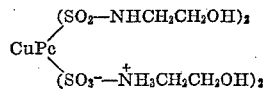

12. The process as claimed in claim 1, wherein the blue pigment is a mixture of the alpha and beta forms thereof.

13. A pigment produced by the process of claim 1.

References Cited
UNITED STATES PATENTS

| | | | |
|---|---|---|---|
| 3,523,030 | 8/1970 | Malin et al. | 106—288 Q |
| 3,057,873 | 10/1962 | Pugin et al. | 260—314.5 |
| 2,861,005 | 11/1958 | Siegel | 106—288 Q |

JAMES E. POER, Primary Examiner